UNITED STATES PATENT OFFICE.

THOMAS P. KINGSFORD, OF OSWEGO, NEW YORK.

MANUFACTURE OF DEXTRINE, GLUCOSE, MALTOSE, AND GRAPE-SUGAR.

SPECIFICATION forming part of Letters Patent No. 280,045, dated June 26, 1883.

Application filed April 27, 1883. (No specimens.)

*To all whom it may concern:*

Be it known that I, THOMAS P. KINGSFORD, of the city of Oswego, in the county of Oswego and State of New York, have invented a new and useful Process for the Manufacture of Dextrine, Glucose, Maltose, and Grape-Sugar from Wheat, Corn, and all other Starch-Producing Substances, of which the following is a specification.

In practicing my invention I proceed as follows: I soak the corn or other material in water, preferably at a temperature of about 62° Fahrenheit, containing as much hydrated or slaked lime as it will dissolve—that is to say, being a saturated solution of lime. Some waters will dissolve more lime than others, as is well known. The soaking should be continued until the material is softened somewhat—that is to say, is sufficiently softened not to affect the starch, but to grind with the best results. The time occupied in soaking will vary considerably, according to the condition of the atmosphere, the temperature, and the nature of the substance treated—say from six to seventy-two hours—and the judgment of the operator skilled in the art must determine when the proper condition of the soaked material has been reached. I grind the corn or other substance, as usual in starch-making, after treatment as above, in any suitable mill or mills with water—that is to say, a stream of water is delivered into the mill with the substance to be ground, as is customary in the manufacture of starch. The ground product is then delivered into a suitable mash-tub, and I pass into and all through the mass thus obtained sulphurous-acid gas, preferably compressed, until the mixture will give a distinctly acid reaction with blue litmus-paper—that is, will turn blue litmus-paper distinctly red. I then add about one-tenth per cent. of nitric acid—that is, for every one hundred pounds of corn used I add one ounce and a half of strong nitric acid of specific gravity 1.558. I then agitate the mixture thoroughly by any convenient means—such as used in breweries and grape-sugar factories. I then run the mixture thus produced into a suitable digester, (Manbrés preferred.) If I wish to produce dextrine, I raise the whole by means of steam to a temperature of about 230° Fahrenheit, or to a pressure of about twenty-one pounds to the square inch, (more or less,) for twenty to thirty minutes, (more or less.) If I wish to produce grape-sugar or glucose, I raise the mixture in the digester to a temperature of 292° to 320° Fahrenheit, or to a pressure of from sixty to ninety pounds per square inch, for fifteen to thirty minutes, (more or less.) If I wish to produce maltose, I raise the mixture to a temperature of 320° to 327° Fahrenheit, or to a pressure of ninety to one hundred pounds per square inch, for fifteen minutes, (more or less.) This last-named part of the process, according to the steam-pressure used, will transform all the starch present into dextrine, glucose, grape-sugar, or maltose, according to the product that may be required. Samples may be taken out, by means of a tap in the bottom of the digester, from time to time and tested, and when the desired result is obtained I run the mixture into a vat through a sieve or sieves, or other separating apparatus, and wash the residue separated by the sieve with water until it ceases to give a reaction by any of the well-known tests for the products being produced. I next neutralize the mixed liquids thus obtained with chalk, marble, or other suitable neutralizing agents mixed with water to about the consistency of cream, and allow the mixture to settle. I then filter the liquid through flannel, or any suitable filtering medium, and press out all the solution of either or any of the substances from the settlings and filter and mix it with the above-named filtered portion. If I wish to produce dextrine, I boil the solution down till it reaches a gravity of about 40° Baumé while hot and allow it to solidify. If I wish to produce any of the other products named, I boil the solution down till it reaches a gravity of 20° Baumé, when all the sulphate of lime in solution will deposit. I filter again, if necessary, through a charcoal filter, evaporating again in a vacuum-pan until it reaches 33° to 35° Baumé while hot. I then run it into a cooler or molds to crystallize or solidify.

By my process I obtain a larger yield and a superior quality of the products named as compared with other processes. At the same time I destroy all the volatile oils present in the material used, which otherwise would give the products a disagreeable odor and flavor and deteriorate their quality and value.

What I claim as new, and desire to secure by Letters Patent of the United States, is—

The process applicable to manufacturing dextrine, glucose, maltose, and grape-sugar herein described, which consists in soaking wheat, corn, or other starch-producing substance in lime-water, then grinding, then treating with sulphurous-acid gas, then applying nitric acid, and finally subjecting to steam-pressure, according to the product desired.

In testimony whereof I have hereunto subscribed my name this 25th day of April, A. D. 1883.

THOMAS P. KINGSFORD.

Witnesses:
MARCUS S. HOPKINS,
HENRY L. HOWE.